United States Patent
Yang

(10) Patent No.: US 9,413,262 B2
(45) Date of Patent: Aug. 9, 2016

(54) SMART POWER ADAPTOR AND METHOD FOR CONTROLLING POWER SUPPLAY THEREOF

(71) Applicant: Muh-Rong Yang, Taipei (TW)

(72) Inventor: Muh-Rong Yang, Taipei (TW)

(73) Assignee: Midastek Microelectronic Inc., Taipei (TW)

( * ) Notice: Subject to any disclaimer, the term of this patent is extended or adjusted under 35 U.S.C. 154(b) by 204 days.

(21) Appl. No.: 14/291,013

(22) Filed: May 30, 2014

(65) Prior Publication Data

US 2015/0263638 A1 Sep. 17, 2015

(30) Foreign Application Priority Data

Mar. 11, 2014 (TW) .............................. 103108399 A

(51) Int. Cl.
| | |
|---|---|
| *G06F 17/50* | (2006.01) |
| *H02M 7/04* | (2006.01) |
| *H01M 10/42* | (2006.01) |
| *H01M 10/44* | (2006.01) |
| *H01M 10/48* | (2006.01) |
| *H02J 7/00* | (2006.01) |
| *H02J 7/04* | (2006.01) |

(52) U.S. Cl.
CPC ............ *H02M 7/04* (2013.01); *H01M 10/4257* (2013.01); *H01M 10/44* (2013.01); *H01M 10/48* (2013.01); *H02J 7/0004* (2013.01); *H01M 2010/4271* (2013.01); *H01M 2010/4278* (2013.01); *H02J 7/0057* (2013.01); *H02J 7/041* (2013.01); *H02J 2007/0098* (2013.01)

(58) Field of Classification Search
USPC ......................................................... 320/128
See application file for complete search history.

(56) References Cited

U.S. PATENT DOCUMENTS

| 5,541,490 A | 7/1996 | Sengupta et al. |
|---|---|---|
| 5,872,444 A | 2/1999 | Nagano et al. |
| 7,928,735 B2 | 4/2011 | Huang et al. |

(Continued)

FOREIGN PATENT DOCUMENTS

| CN | 102130488 | 7/2011 |
|---|---|---|
| CN | 102508167 | 6/2012 |

(Continued)

OTHER PUBLICATIONS

"Office Action of European Counterpart Application," issued on Jul. 31, 2015, p. 1-p. 7, in which the listed references were cited.
"Office Action of Taiwan Counterpart Application" , issued on May 27, 2015, p. 1-p. 8, in which the listed references were cited.

*Primary Examiner* — Mohammed Alam
(74) *Attorney, Agent, or Firm* — Jianq Chyun IP Office

(57) ABSTRACT

A smart power adaptor and a method of controlling power supply thereof are provided. The smart power adaptor includes a power conversion circuit and a control unit. The power conversion circuit is configured to convert an alternating current (AC) power into a direct current (DC) power for providing to a load device. The control unit is coupled to the power conversion circuit. The control unit is configured to apply a corresponding power-supply control mean according to a power state through communication of a charging communication protocol of a battery module of the load device to control an operation of the power conversion circuit, so that the power conversion circuit uses different power conversion behaviors to generate the DC power in response to changing of the power status.

32 Claims, 8 Drawing Sheets

(56) References Cited

U.S. PATENT DOCUMENTS

2003/0193318 A1* 10/2003 Ozawa .................. H02J 7/0047
320/132
2009/0212735 A1* 8/2009 Kung .................... H02J 7/0052
320/101
2012/0210150 A1* 8/2012 de Lind van
Wijngaarden ......... G06F 1/3212
713/320

FOREIGN PATENT DOCUMENTS

| EP | 2605363 | 6/2013 |
| TW | 440100 | 6/2001 |
| TW | 201251269 | 12/2012 |
| TW | 201346303 | 11/2013 |

* cited by examiner

SMART POWER ADAPTOR AND METHOD FOR CONTROLLING POWER SUPPLAY THEREOF

CROSS-REFERENCE TO RELATED APPLICATION

This application claims the priority benefit of Taiwan application serial no. 103108399, filed on Mar. 11, 2014. The entirety of the above-mentioned patent application is hereby incorporated by reference herein and made a part of this specification.

BACKGROUND

1. Technical Field

The invention relates to a power adaptor, and particularly relates to a smart power adaptor capable of adjusting an output according to a power requirement of a load device through communication of a charging communication protocol and a method for controlling power supply thereof.

2. Related Art

In current electronic product applications, if an alternating current (AC) power such as a city power is used as a power source of an electronic apparatus, a power adaptor is generally used to convert the AC power into a direct current (DC) power, and the DC power is provided to the electronic apparatus for usage.

Regarding the electronic apparatus, an actual power consumption thereof is closely related to an operation state of the electronic apparatus. For example, if a battery module of the electronic apparatus is in a low power state, a charge control chip generally adopts a fast charging method (i.e. constant current charging) to implement the charge operation (i.e. a charge current is relatively high), and now the electronic apparatus has higher power consumption. Further, if the battery module of the electronic apparatus is in a near fully charged state, the charge control chip generally adopts a constant voltage charging method to implement the charge operation (i.e. a charge current is relatively low), such that a battery voltage of the battery module can be gradually stabilized at a fully charges voltage, and the power consumption of the electronic apparatus is relatively low.

The power adaptor generally converts an AC power into a DC power with a fixed power and provides the same to the electronic apparatus for usage. In other words, regardless of the actual power consumption of the electronic apparatus, the power adaptor provides the DC power with the same power to the electronic apparatus. Inevitably, in case that the electronic apparatus only consumes a small part of the power provided by the power adaptor, the most part of the power provided by the power adaptor becomes meaningless power loss.

SUMMARY

The invention is directed to a smart power adaptor and a method for controlling power supply, which is capable of adaptively provide a corresponding direct current (DC) power according to an actual power requirement of a load device.

The invention provides a smart power adaptor including a power conversion circuit and a control unit. The power conversion circuit is configured to convert an alternating current (AC) power into a direct current (DC) power for providing to a load device. The control unit is coupled to the power conversion circuit. The control unit is configured to adopt a corresponding power-supply control means to control an operation of the power conversion circuit through communication of a charging communication protocol according to a power state of a battery module of the load device, such that the power conversion circuit uses different power conversion behaviours to generate the DC power in response to changing of the power state.

The invention provides a method for controlling power supply of a smart power adaptor, which includes following steps. An alternating current (AC) power is received. The AC power is converted into a direct current (DC) power and provided to a load device. A corresponding power-supply control means is adopted to control generation of the DC power through communication of a charging communication protocol according to a power state of a battery module of the load device, such that different power conversion behaviours are used to generate the DC power in response to changing of the power state.

According to the above descriptions, the invention provides a smart power adaptor an a method for controlling power supply thereof, by which a corresponding power-supply control means is adaptively adopted to control generation of the DC power according to a current power state/charge mode of the battery module, such that the power of the DC power provided by the smart power adaptor can be dynamically varied according to an actual power requirement of the load device. In this way, the smart power adaptor of the invention can effectively avoid a power waste to achieve higher power supplying efficiency.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
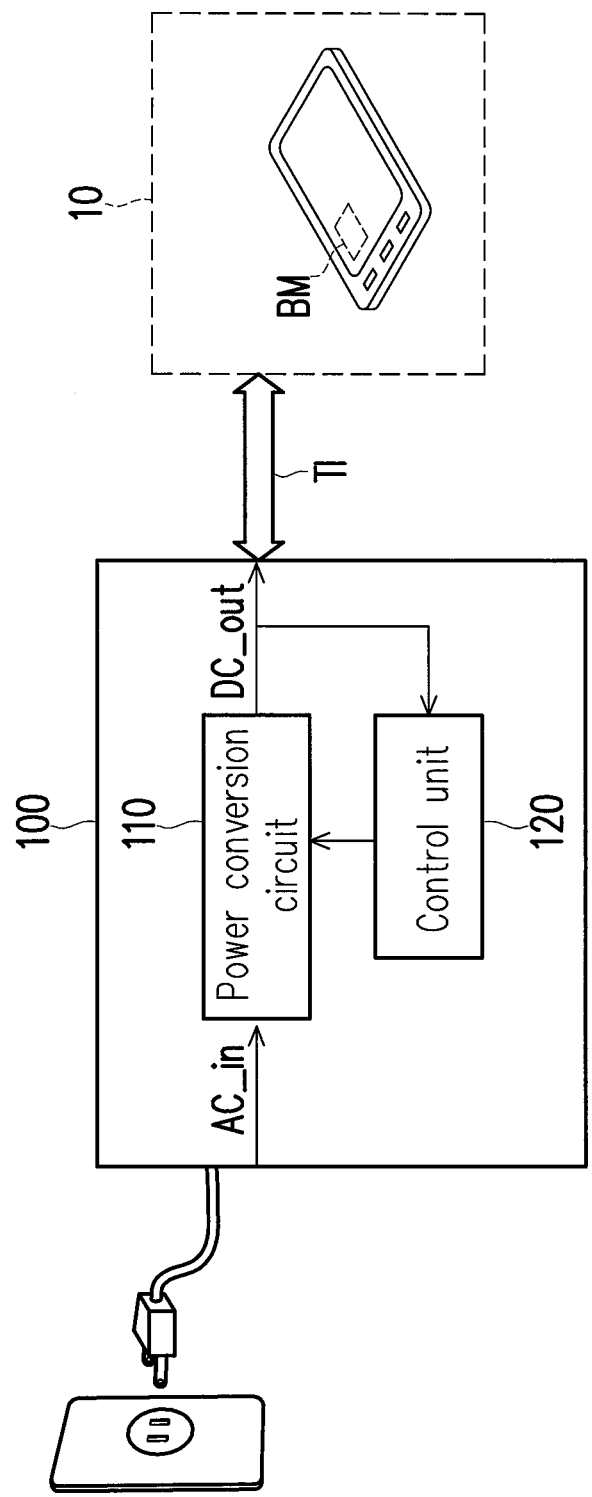
FIG. 1 is a schematic diagram of a smart power adaptor according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a smart power adaptor according to an embodiment of the invention. Referring to FIG. 1, the smart power adaptor 100 of the present embodiment includes a power conversion circuit 110 and a control unit 120.

In the present embodiment, the power conversion circuit 110 can receive an alternating current (AC) power AC_in (for example, city power, though the invention is not limited thereto) from external, and converts the received AC power AC_in into a direct current (DC) power DC_out for providing to a load device 10 for usage. In other words, the load device 10 can receive the AC power AC_in (which is provided in form of the DC power DC_out) through the smart power adaptor 100 to serve as a power supply source for operations and charging of the load device 10. The load device 10 can be an electronic device such as a notebook computer, a tablet PC, a smart phone, etc. (the smart phone is illustrated in FIG. 1, though the invention is not limited thereto). It should be noticed that in the present embodiment, a circuit topology pattern of the power conversion circuit 110 can be forward power conversion circuit, a flyback power conversion circuit, an active clamp and half bridge power conversion circuit, an active clamp and full bridge power conversion circuit or a push-pull power conversion circuit, though the invention is not limited thereto. Structures and operation methods of the aforementioned various power conversion circuits are known by those skilled in the art, so that details thereof are not repeated.

The control unit 120 is coupled to the power conversion circuit 110, and is configured to adopt a corresponding power-supply control means (for example, a low current power-supply control, a constant current power-supply control and a constant voltage power-supply control, etc.) to control an operation of the power conversion circuit 110 through communication of a charging communication protocol according to a power state of a battery module BM of the load device 10, such that the power conversion circuit 110 uses different power conversion behaviours to generate the DC power DC_out in response to changing of the power state of the battery module BM. The battery module BM can be a lithium battery module, though the invention is not limited thereto.

To be specific, the smart power adaptor 100 of the present embodiment can provide the DC power DC_out having a corresponding power characteristic to the load device 10 in collaboration with a charging behaviour sequence of the battery module BM, such that the power provided by the smart power adaptor 100 can be changed according to an actual power consumed by the load device 10. For example, if the control unit 120 determines that the battery module BM is charged in a constant current mode through communication of a charging communication protocol, or by passively receiving the power state from a charge control chip or detecting the battery module BM, the control unit 120 correspondingly controls the power conversion circuit 110 to use a constant current power conversion behaviour to generate the DC power DC_out; if the control unit 120 determines that the battery module BM is changed from the constant current charging to the constant voltage charging, the control unit 120 correspondingly controls the power conversion circuit 110 to use a constant voltage power conversion behaviour to generate the DC power DC_out. Moreover, a power specification (such as a magnitude of the output voltage, a magnitude of the output current) of the DC power DC_out generated by the power conversion circuit 110 can also be adjusted by the control unit 120 by adjusting a power parameter of the power-supply control means according to the power state of the battery module BM.

Therefore, the power of the DC power DC_out provided by the smart power adaptor 100 is positively related to a total power (i.e. the actual power consumption of the load device 10) required in charging of the battery module BM and the operation of the load device 10. Therefore, the problem of the conventional technique that the load device 10 only consumes a small part of the power provided by the power adaptor to cause waste of most part of the power provided by the power adaptor can be effectively mitigated. In other words, the smart power adaptor 100 of the present embodiment has a higher power-supply performance compared to the conventional power adaptor.

Moreover, since the smart power adaptor 100 of the present embodiment can provide the corresponding DC power DC_out according to the power state of the battery module BM, even if the charge control chip (not shown) of the battery module BM is failed, the smart power adaptor 100 can adaptively decrease the provided DC power DC_out after charging the battery module BM, so as to decrease a risk of damaging the load device 10.

In order to clearly describe the smart power adaptor of the invention, a hardware structure of the smart power adaptor (an embodiment of FIG. 2) and a method for controlling power supply (the embodiments of FIG. 3 to FIG. 8) are respectively described below.

Figure 2:
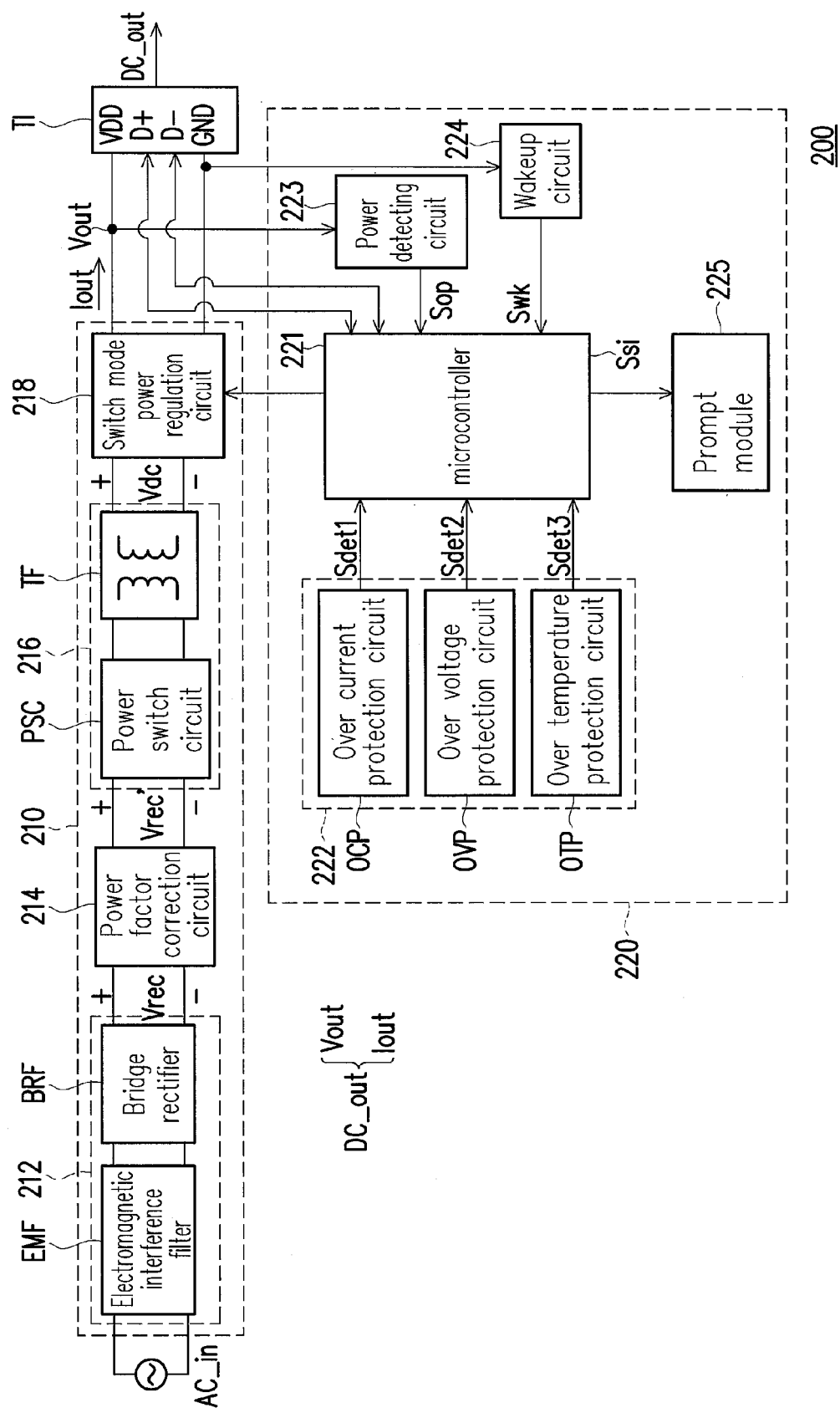
FIG. 2 is a schematic diagram of a smart power adaptor according to another embodiment of the invention.

The hardware structure of the smart power adaptor is first described below. FIG. 2 is a schematic diagram of a smart power adaptor according to another embodiment of the invention. Referring to FIG. 2, the smart power adaptor 200 includes a power conversion circuit 210 and a control unit 220. The power conversion circuit 210 includes an input stage circuit 212, a power factor correction circuit 214, a power stage circuit 216 and a switching mode power regulation circuit 218. The various circuits 212-218 in the power conversion circuit 210 can be sequentially connected to each other in sequence, where the smart power adaptor 200 takes an input terminal of the input stage circuit 212 as an input terminal thereof (which is adapted to be connected to the AC power AC_in), and takes an output terminal of the switching mode power regulation circuit 218 as an output terminal thereof (which is adapted to be connected to the load device (not shown) through a transmission interface TI). The control unit 220 includes a microcontroller 221, a protection circuit 222, a load power detecting circuit 223, a wakeup circuit 224 and a prompt module 225.

In the power conversion circuit 210, the input stage circuit 212 is, for example, composed of an electromagnetic interference filter EMF and a bridge rectifier BRF (for example, a full bridge rectifier and a half bridge rectifier, which is not limited by the invention). The anti-electromagnetic interference filter EMF receives the AC power AC_in, and suppresses an electromagnetic noise of the AC power AC_in. the bridge rectifier BRF receives the noise-suppressed AC power AC_in, and rectifies the AC power AC_in (for example, performs a full-wave rectifying or a half-wave rectifying according to different structures of the bridge rectifier, which is not limited by the invention) to generate a rectified voltage Vrec. In other words, the input stage circuit 212 is used to receive the AC power AC_in and rectifies and filters the AC power AC_in to generate the rectified voltage.

An input terminal of the power factor correction circuit 214 is coupled to an output terminal of the bridge rectifier BRF, and the power factor correction circuit 214 performs a power factor correction on the rectified voltage Vrec related to the AC power AC_in, and provides the power factor corrected rectified voltage Vrec' to the power stage circuit 216.

The power stage circuit 216 is, for example, composed of a power switch circuit PSC and a transformer TF. The power switch circuit PSC can transmit the received rectified voltage Vrec' to a primary side of the transformer TF through an intermittent/switching manner, and the secondary side of the transformer TF inducts the voltage on the primary side to generate a DC voltage Vdc.

The switching mode power regulation circuit 218 takes the DC voltage Vdc output by the transformer TF as an input voltage, and is controlled by the microcontroller 221 to perform a voltage regulation (boost conversion, buck conversion, boost buck conversion or synchronous rectification, etc.) to the DC voltage Vdc, so as to generate a DC power DC_out (including a DC output voltage Vout and a DC output current Iout). In this way, the switching mode power regulation circuit 218 is, for example, a constant current switch circuit, a constant voltage switch circuit, a pulse width modulation (PWM) switch circuit or a synchronous rectification circuit, etc. in an actual circuit topology design, which is not limited by the invention.

In an exemplary embodiment, the power conversion circuit 210 further includes a feedback stage circuit (not shown). The feedback stage circuit can be coupled between the power stage circuit 216 and the output terminal of the switching mode power regulation circuit 218, so as to sample the DC output voltage Vout and the DC output current Iout and feed back the same to the power stage circuit 210, and the power stage circuit 210 can dynamically adjust a magnitude of the output DC voltage Vdc.

On the other hand, in the control unit 220, the microcontroller 221 adopts a corresponding power-supply control means to control a switch operation of the switching mode power regulation circuit 218 through communication of a charging communication protocol according to a power state of a battery module of the load device, or the microcontroller 221 implements the same by passively receiving the power state from the charge control chip or actively detecting the battery module, so as to adjust a level of the DC output voltage Vout and/or a current magnitude of the DC output current Iout generated by the switching mode power regulation circuit 218.

The protection circuit 222 is coupled to the microcontroller 221, which is used for detecting an operation state of the smart power adaptor 200, and sends state detecting signals (for example, Sdet1, Sdet2, Sdet3) when the operation state of the smart power adaptor 200 is abnormal, and the microcontroller 221 controls the switching mode power regulation circuit 218 to stop generating/clamp the DC voltage DC_out in response to the state detecting signals. The protection circuit 222, for example, includes an over current protection circuit OCP, an over voltage protection circuit OVP and/or an over temperature protection circuit OTP. In other words, when the protection circuit 222 determines that the operation state of the smart power adaptor 200 is abnormal, a possible situation is that the DC output voltage Vout, the DC output current Iout and/or a device temperature exceed predetermined values, though the invention is not limited thereto.

The power detecting circuit 223 is used for detecting the DC power DC_out provide to the load device, and sends an output power signal Sop to the microcontroller 221. Under different power-supply control means, the microcontroller 221 can select the DC output voltage Vout or the DC output current Iout according to the output power signal Sop to serve as a basis for controlling the switching mode power regulation circuit 218. For example, under the constant current control means, the microcontroller 221 takes a magnitude of the DC output current Iout as the basis for controlling the switching mode power regulation circuit 218, such that the DC output current Iout is maintained to a constant current value. Conversely, under the constant voltage control means, the microcontroller 221 takes a magnitude of the DC output voltage Vout as the basis for controlling the switching mode power regulation circuit 218, such that the DC output voltage Vout is maintained to a constant voltage value.

The wakeup circuit 224 is used for detecting whether the smart power adaptor 200 is connected to the load device, and sends a wakeup signal Swk to the microcontroller 221 when detecting that the smart power adaptor 200 is connected to the load device. After the microcontroller 221 is waken up by the wakeup signal Swk, the microcontroller 221 controls the switching mode power regulation circuit 218 to start generating the DC power DC_out.

The prompt module 225 generates a power-supply state prompt according to a state indication signal Ssi sent by the microcontroller 221. The power-supply state prompt sent by the prompt module 225 corresponds to a current power supplying/charging state, power-supply control means of the smart power adaptor 200 and/or a power capacity of the battery module, such that the user can learn current operation states of the smart power adaptor 200 and the battery module by checking the power-supply state prompt sent by the prompt module 225.

For example, the prompt module 225 is a light-emitting diode (LED) module, and the power-supply state prompt thereof is, for example, a light signal indicating the current power supplying/charging state. Alternatively, the prompt module 225 is a display panel, and the power-supply state prompt thereof is, for example, a text message indicating the current power supplying/charging state. However, the invention is not limited thereto.

Moreover, in the present embodiment, the transmission interface TI is, for example, a USB interface (which is referred to as a USB interface TI hereinafter), where the USB interface TI includes a VDD terminal, a GND terminal, a D+ terminal and a D− terminal. The power output terminal and the ground terminal of the switching mode power regulation circuit 218 are respectively connected to the VDD terminal and the GND terminal of the USB interface TI.

In addition, in the USB interface TI, the D+ terminal and the D− terminal used for transmitting data are connected to the microcontroller 221. Therefore, the microcontroller 221 can communicate with the charge control chip in the battery module through the D+ terminal and the D− terminal, such that the microcontroller 221 can adaptively adjust the DC power DC_out output by the switching mode power regulation circuit 218 according to a characteristic and a charging state of the battery module.

Methods for controlling power supply are described below. In the present embodiment, the method has three different implementations based on different ways that the control unit obtains the power state of the battery module, which are respectively: (1) the control unit 120 obtains the power state from the charge control chip through a communication manner (the charging communication protocol); (2) the control unit 120 passively receives the power state from the charge control chip; and (3) the control unit 120 actively detects the power state of the battery module. The steps of the embodiments of FIG. 3 and FIG. 4 correspond to the implementation (1); the steps of the embodiments of FIG. 5 and FIG. 6 correspond to the implementation (2); and the steps of the embodiments of FIG. 7 and FIG. 8 correspond to the implementation (3).

Figure 3:
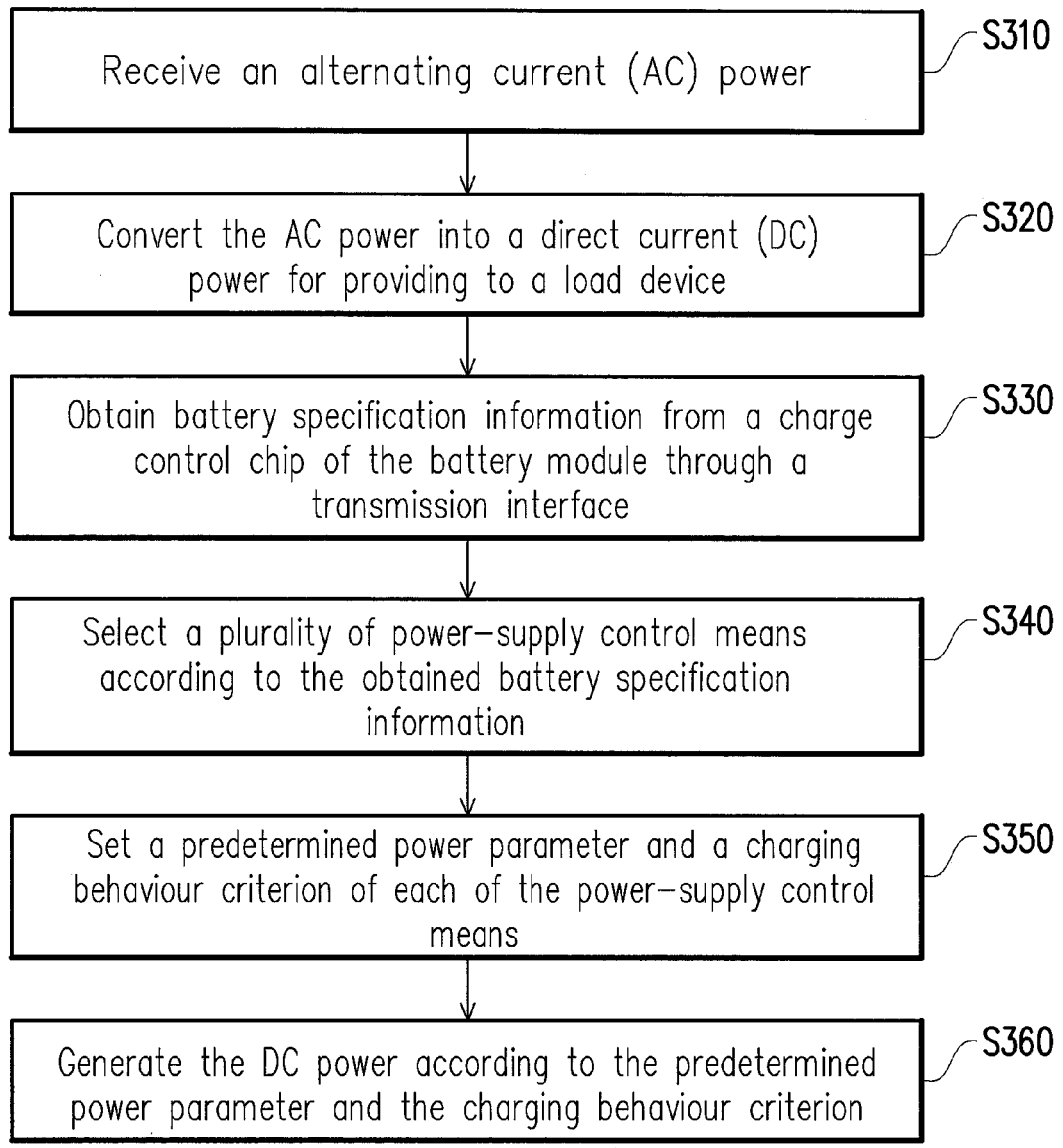
FIG. 3 is a flowchart illustrating steps of a method for controlling power supply of a smart power adaptor according to an embodiment of the invention.

Referring to FIG. 3, FIG. 3 is a flowchart illustrating steps of a method for controlling power supply of a smart power adaptor according to an embodiment of the invention. The method for controlling power supply is adapted to the smart power adaptors 100 or 200 shown FIG. 1 or FIG. 2, the steps of the present embodiment are described below with reference of the smart power adaptor 100 of the embodiment of FIG. 1, though the invention is not limited thereto.

In the present embodiment, the power conversion circuit 110 receives the AC power AC_in (step S310), and converts the AC power AC_in into a DC power DC_out for providing to the load device 10 (step S320). During a period that the power conversion circuit 110 performs the AC-DC conversion, the control unit 120 obtains battery specification information (such as battery type, battery service life, battery maximum voltage, battery maximum current, etc.) from the charge control chip of the battery module BM through the transmission interface TI (step S330). Then, the control unit 120 selects a plurality of power-supply control means according to the obtained battery specification information (step S340).

After a plurality of specific power-supply control means are selected, the control unit 120 sequentially sets a predetermined power parameter and a charging behaviour criterion of each of the power-supply control means (step S350), and sequentially executes the corresponding power-supply control means according to the predetermined power parameter and the charging behaviour criterion, and the power conversion circuit 110 uses a corresponding power conversion behaviour to generate the DC power DC_out (step S360).

In other words, in the present embodiment, the control unit 120 can establish a specific communication protocol with the charge control chip, and defines a behaviour sequence, a power parameter and a behaviour criterion of the power-supply control means according to the specification and power state of the battery module BM. The behaviour sequence, the power parameter and the behaviour criterion of the power-supply control means basically correspond to the charging behaviour of the battery module BM. Therefore, regarding the whole power-supply behaviour of the smart power adaptor 100, the control unit 120 can correspondingly adjust the power-supplying control means along with changing of the power state/charge mode of the battery module BM. Namely, the DC power DC_out provided by the power conversion circuit 110 is changed along with a charging demand of the battery module BM.

In view of the hardware structure of the smart power adaptor 200 of the embodiment of FIG. 2, the operation that the control unit 120 changes the adopted power-supply control means and the operation that the control unit 120 adjusts the power specification of the DC power DC_out can be implemented by using the microcontroller 221 to adjust a switching frequency/duty cycle of the switching mode power regulation circuit 218, where the switching mode power regulation circuit 218 may generate the DC power DC_out having a characteristic of low current/constant current/constant voltage in response to variation of the switching frequency/duty cycle.

It should be noticed that besides that the control unit 120 can adopt different power-supply control means according to the power state of the battery module BM, the control unit 120 can further execute the corresponding power-supply control means according to the predetermined power parameter and the charging behaviour criterion of each power-supply control means that are set by the designer. The predetermined power parameter is, for example, a predetermined voltage parameter, a predetermined current parameter and/or a predetermined charging time parameter, and the charging behaviour criterion is, for example, an upper limit voltage condition, an upper limit current condition and/or an upper limit temperature condition.

For example, the designer can set the predetermined voltage parameter and the predetermined current parameter of the constant current power-supply control means to 5V and 1 A. Under such condition, when the control unit 120 controls the power conversion circuit 110 through the constant current power-supply control means, the DC output current output by the power conversion circuit 110 is maintained to 1 A, and the maximum DC output voltage does not exceed 5V (i.e. the output power is 5 W). For another example, the designer can set the predetermined voltage parameter, the predetermined current parameter and the predetermined charging time parameter of the constant voltage power-supply control means to 5V, 600 mA and 1 hour. Under such condition, when the control unit 120 controls the power conversion circuit 110 through the constant voltage power-supply control means, the DC output voltage output by the power conversion circuit 110 is maintained to 5V, and the maximum DC output current does not exceed 600 mA (i.e. the output power is 3 W). Moreover, once the control unit 120 determines that the time of adopting the constant voltage power-supply control means is more than 1 hour, the control unit 120 switches the constant voltage power-supply control means to other power-supply control means, or stops the operation of the power conversion circuit 110.

On the other hand, when the control unit 120 determines that the smart power adaptor 100 exceeds the set charging behaviour criterion, the control unit 120 can stop/limit the operation of the power conversion circuit 110 or control the power conversion circuit 110 through the low-current power-supply control means, so as to avoid damaging the smart power adaptor 100. For example, the upper limit voltage condition, the upper limit current condition and the upper limit temperature condition are respectively 10V, 3 A and 70° C., and as long as the control unit 120 determines that the smart power adaptor 100 is matched with any of the above conditions, the current power-supply control means is changed to the low current power-supply control means.

Figure 4:
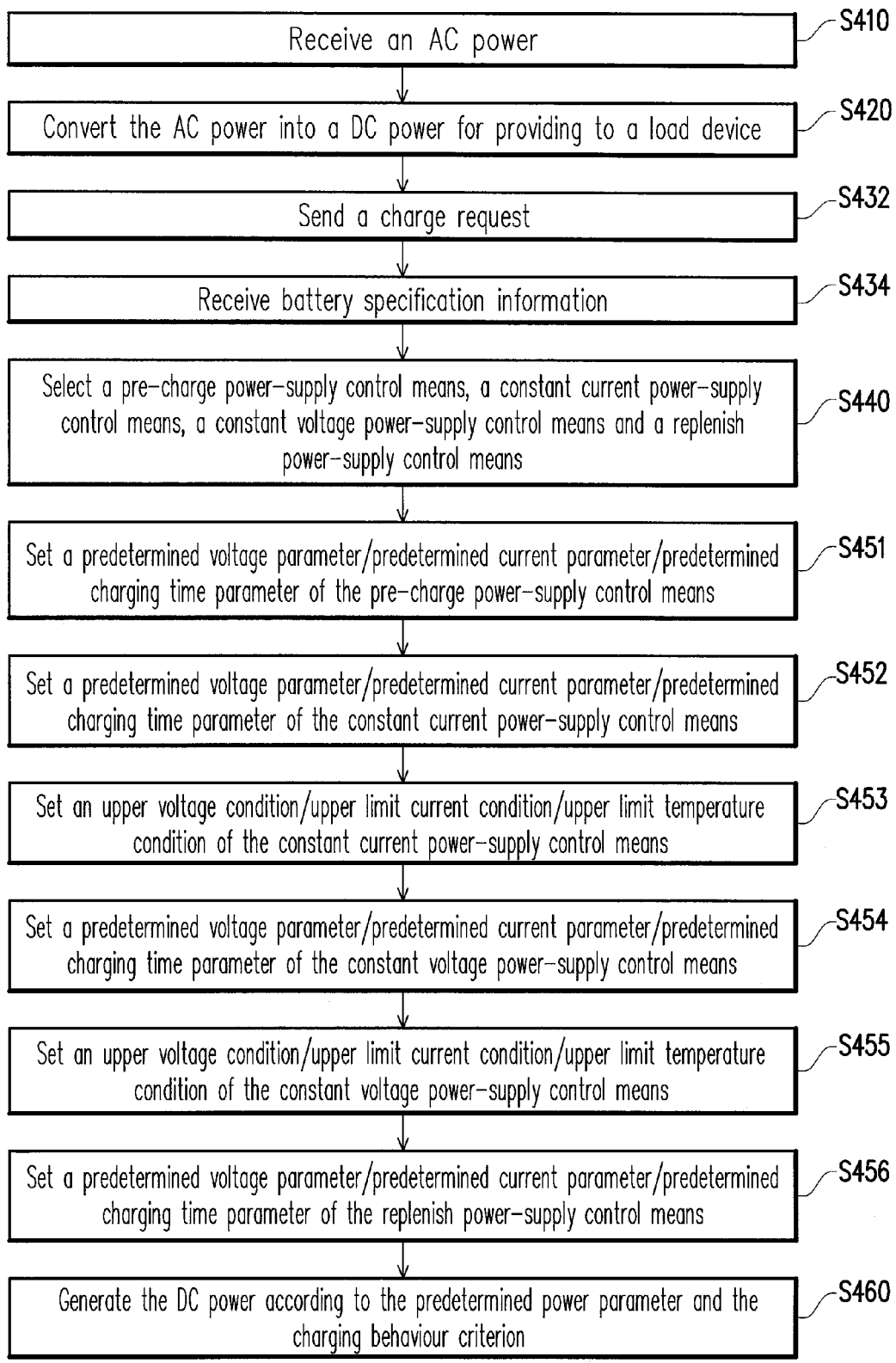
FIG. 4 is a flowchart illustrating a method for controlling power supply of a smart power adaptor according to the embodiment of FIG. 3.

An implementation of the embodiment of FIG. 3 is further described below with reference of the steps of FIG. 4, where FIG. 4 is a flowchart illustrating a method for controlling power supply of a smart power adaptor according to the embodiment of FIG. 3.

Referring to FIG. 1 and FIG. 4, in the present embodiment, the steps S410 and S420 are the same to the steps S310 and S320. After the step S420, the control unit 120 sends a charge request to the charge control chip (step S432), and the charge control chip transmits back the battery specification information after receiving the charge request sent by the control unit 120.

After the control unit 120 receives the battery specification information transmitted back by the charge control chip (step S434), the control unit 120 further selects a pre-charge power-supply control means, a constant current power-supply control means, a constant voltage power-supply control means and a replenish power-supply control means (though the invention is not limited thereto) to implement a power-supply control for charging the battery module (440). The pre-charge power-supply control means and the replenish power-supply control means are all similar to the aforementioned low current power-supply control means, and are used for controlling the power conversion circuit 110 to provide the DC power DC_out with a value lower than a predetermined current value. Moreover, a behaviour sequence of the power-supply control means of the present embodiment is, for example, defined as the pre-charge power-supply control means→the constant current power-supply control means→the constant voltage power-supply control means→the replenish power-supply control means (though the invention is not limited thereto).

Then, the control unit 120 sequentially sets a predetermined voltage parameter/predetermined current parameter/predetermined charging time parameter of the pre-charge power-supply control means (steps S451), a predetermined voltage parameter/predetermined current parameter/predetermined charging time parameter of the constant current power-supply control means (steps S452), an upper voltage condition/upper limit current condition/upper limit temperature condition of the constant current power-supply control means (steps S453), a predetermined voltage parameter/predetermined current parameter/predetermined charging time parameter of the constant voltage power-supply control means (steps S454), an upper voltage condition/upper limit current condition/upper limit temperature condition of the constant voltage power-supply control means (steps S455), and a predetermined voltage parameter/predetermined current parameter/predetermined charging time parameter of the replenish power-supply control means (steps S456).

After the predetermined power parameter and the charging behaviour criterion are set, the control unit 120 starts to sequentially execute the corresponding power-supply control means according to the predetermined power parameter and the charging behaviour criterion, and the power conversion circuit 110 uses the corresponding power conversion behaviour to generate the DC power DC_out (step S460).

In the present embodiment, the control unit 120 switches the power-supply control means to the replenish power-supply control means when the smart power adaptor 100 exceeds the set charging behaviour criterion, so as to decrease the magnitude of the DC output current, though the invention is not limited thereto.

Figure 5:
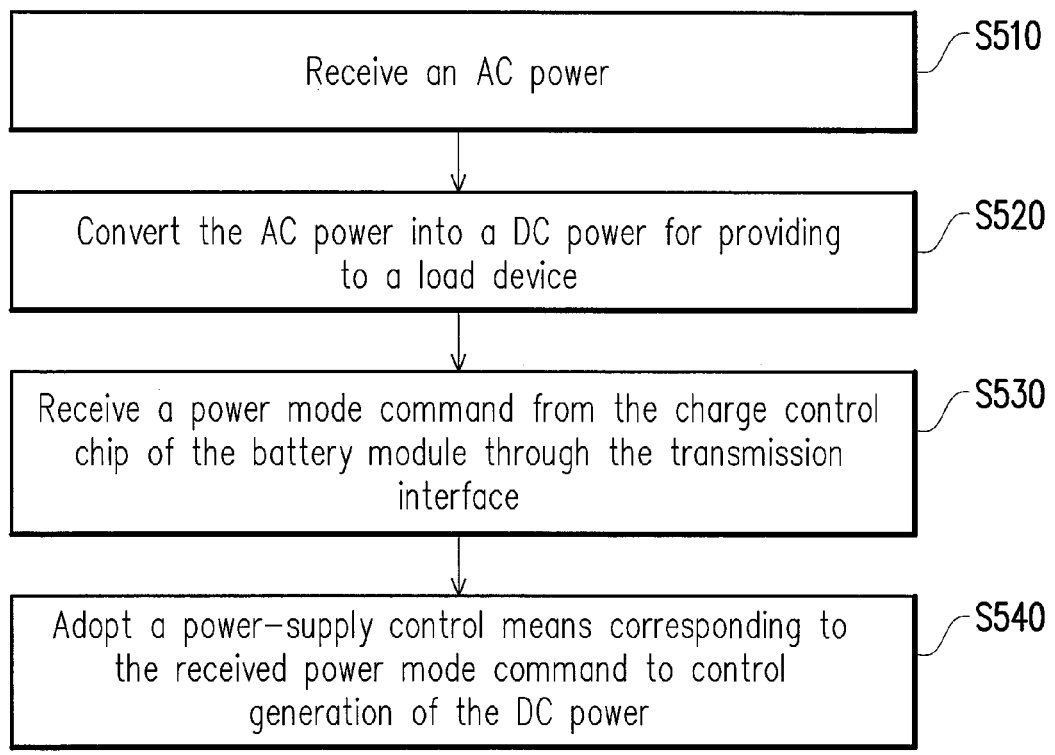
FIG. 5 is a flowchart illustrating a method for controlling power supply of a smart power adaptor according to another embodiment of the invention.

Referring to FIG. 5, FIG. 5 is a flowchart illustrating a method for controlling power supply of a smart power adaptor according to another embodiment of the invention. The steps of the method are described below with reference of the smart power adaptor 100 of the embodiment of FIG. 1.

A step S510 of the present embodiment is substantially the same to the aforementioned steps S310 and S410, and a step S520 is substantially the same to the aforementioned steps S320 and S420, and details thereof are not repeated. In the present embodiment, during a period that the power conversion circuit 110 performs the AC-DC conversion, the control unit 120 receives a power mode command from the charge control chip of the battery module BM through the transmission interface TI, where the power mode command received by the control unit 120 indicates a current power state of the battery module BM (step S530). Then, the control unit 120 adopts a power-supply control means corresponding to the received power mode command to control the power conversion circuit 110 to generate the DC power DC_out (step S540).

In other words, in the present embodiment, the control unit 120 passively receives the power mode command sent by the charging control chip of the battery module BM to learn a current power state/charge mode of the battery module BM. Therefore, the control unit 120 can accordingly adjust the power-supply control means in response to variation of the charting mode of the battery module BM, such that the DC power DC_out provided by the power conversion circuit 110 can be changed along with variation of a charge requirement/charge mode of the battery module.

Figure 6:
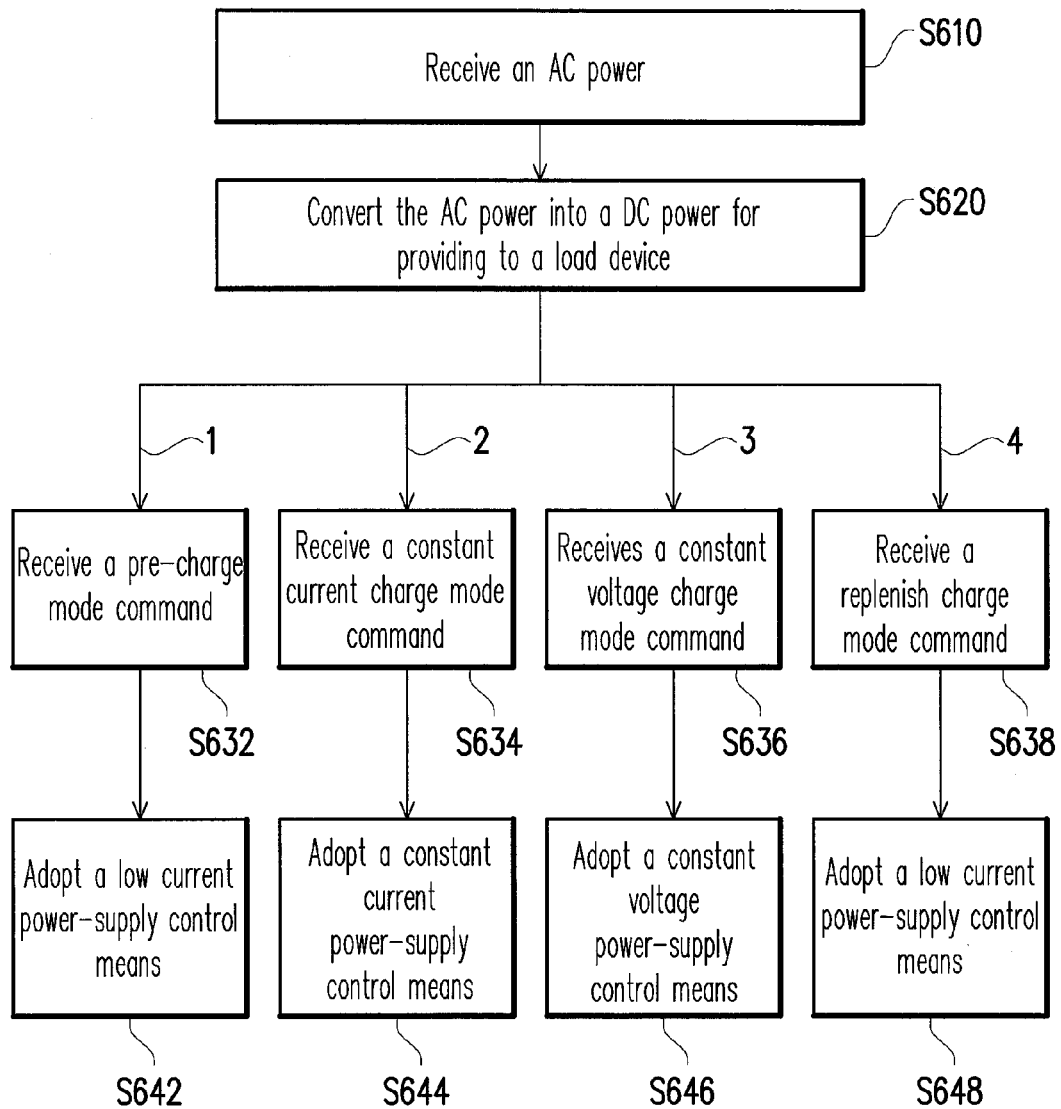
FIG. 6 is a flowchart illustrating a method for controlling power supply of a smart power adaptor according to the embodiment of FIG. 5.

An implementation of the embodiment of FIG. 5 is further described below with reference of the steps of FIG. 6, where FIG. 6 is a flowchart illustrating a method for controlling power supply of a smart power adaptor according to the embodiment of FIG. 5.

Referring to FIG. 1 and FIG. 6, in the present embodiment, the steps S610 and S620 are the same to the steps S510 and S520. After the step S620, the control unit 120 selects to executes an operation corresponding to one of command paths 1-4 according to the received power mode command.

In detail, when the power mode command received by the control unit 120 is a pre-charge mode command sent by the charge control chip (step S632, the command path 1), it represents that the battery module BM is now operated under a pre-charge mode. Therefore, the control unit 120 correspondingly adopts the low current power-supply control means to control the operation of the power conversion circuit 110, and the power conversion circuit 110 provides the DC power DC_out with a value lower than a first predetermined current value (for example, 100 mA) to charge the battery module BM (step S642).

When the power mode command received by the control unit 120 is a constant current charge mode command sent by the charge control chip (step S634, the command path 2), it represents that the battery module BM is now operated under a constant current charge mode/fast charge mode. Therefore, the control unit 120 correspondingly adopts the constant current power-supply control means to control the operation of the power conversion circuit 110, and the power conversion circuit 110 provides the DC power DC_out in a constant current mode to charge the battery module BM (step S644).

When the power mode command received by the control unit 120 is a constant voltage charge mode command sent by the charge control chip (step S636, the command path 3), it represents that the battery module BM is now operated under a constant voltage charge mode. The control unit 120 correspondingly adopts the constant voltage power-supply control means to control the operation of the power conversion circuit 110, and the power conversion circuit 110 provides the DC power DC_out in a constant voltage mode to charge the battery module BM (step S646).

When the power mode command received by the control unit 120 is a replenish charge mode command sent by the charge control chip (step S638, the command path 4), it represents that the battery module BM is now operated under a replenish charge mode. The control unit 120 correspondingly adopts the low current power-supply control means to control the operation of the power conversion circuit 110, and the power conversion circuit 110 provides the DC power DC_out with a value lower than a second predetermined current value (for example, 100 mA) to charge the battery module BM (step S648).

Besides, in another exemplary embodiment, the control unit 120 can further count a time period when the power mode command is not received, and stops/limits the operation of the power conversion circuit 110 or is changed to adopt the low current power-supply control means to control the power conversion circuit 110 when determining that the power mode command is not received for a predetermined time (which probably represents that the battery module BM is failed/abnormal), though the invention is not limited thereto.

Figure 7:
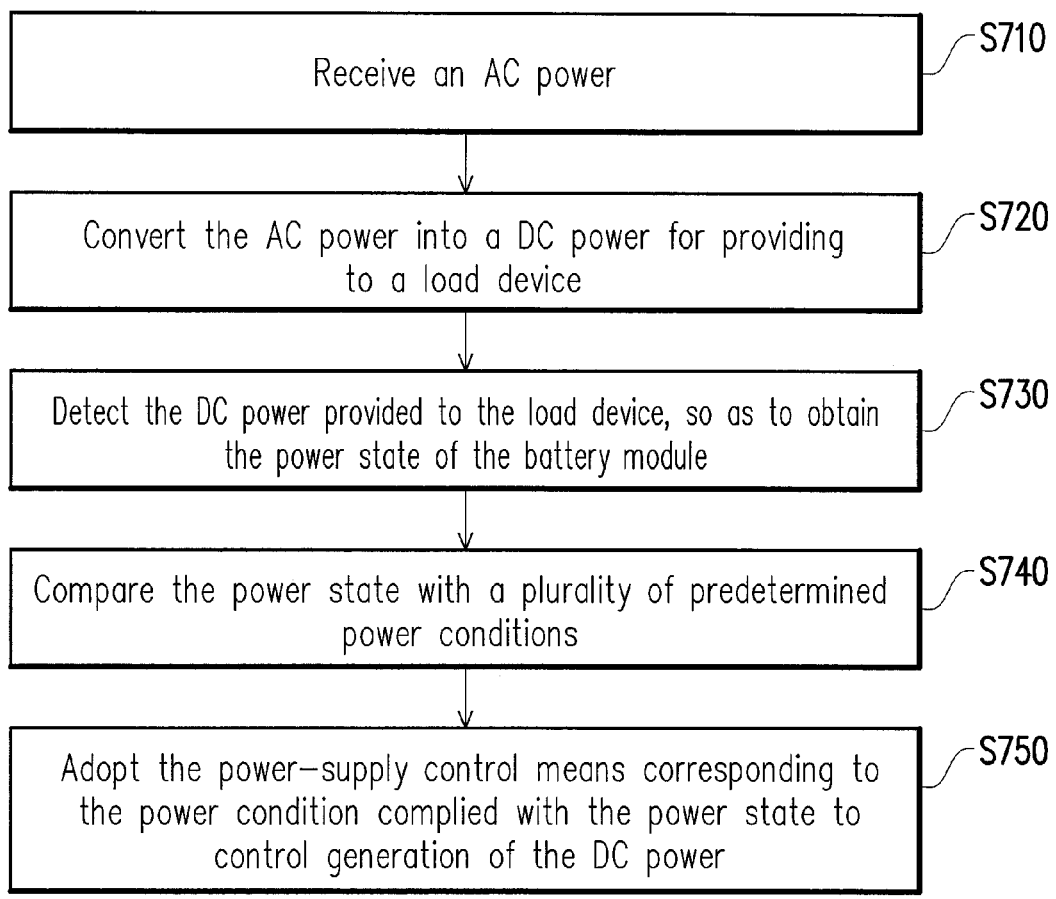
FIG. 7 is a flowchart illustrating a method for controlling power supply of a smart power adaptor according to another embodiment of the invention.

Referring to FIG. 7, FIG. 7 is a flowchart illustrating a method for controlling power supply of a smart power adaptor according to another embodiment of the invention. Detailed steps of the present embodiment are described below with reference of the smart power adaptor 100 of the embodiment of FIG. 1.

A step S710 of the present embodiment is substantially the same to the aforementioned steps S310, S410, S510 and S610, and a step S720 is substantially the same to the aforementioned steps S320, S420, S520 and S620, and details thereof are not repeated. In the present embodiment, during a period that the power conversion circuit 110 performs the AC-DC conversion, the control unit 120 detects the DC power DC_out (including the DC output voltage and the DC output current) provided to the load device 10, so as to obtain/ calculate the power state of the battery module BM (step S730), where the power state is, for example, a rough battery voltage, a charge current and/or a battery level ratio (i.e. a current battery level/a fully charged battery level) of the battery module BM.

Then, the control unit 120 compares the obtained power state with a plurality of predetermined power conditions (step S740), where different power conditions correspond to different power-supply control means. Therefore, according to the comparison result, the control unit 120 can adopt the power-supply control means corresponding to the power condition matched with the current power state to control generation of the DC power DC_out (step S750).

In detail, the power-supply control means adopted by the control unit 120 are, for example, the low current power-supply control means, the constant current power-supply control means and the constant voltage power-supply control means. The aforementioned power condition can be set according to a design requirement of the user. For example, the designer can set as that when the control unit 120 detects that the charge current is smaller than a first predetermined current threshold, the control unit 120 adopts the low current power-supply control means to control the power conversion circuit 110, and the power conversion circuit 110 provides the low current DC power DC_out to charge the battery module BM. Conversely, the designer can set as that when the control unit 120 detects that the charge current is greater than or equal to a second predetermined current threshold, the control unit 120 adopts the constant current power-supply control means to control the power conversion circuit 110, and the power conversion circuit 110 provides the DC power DC_out in a constant current mode to charge the battery module BM.

In other words, in the present embodiment, the control unit 120 actively detects the DC power DC_out output by the power conversion circuit 110 to learn the power state of the battery module BM. Therefore, the control unit 120 can accordingly adjust the power-supply control means in response to a charge mode variation of the battery module BM, and the DC power DC_out provided by the power conversion circuit 110 can be changed along with the charge requirement of the battery module BM.

Figure 8:
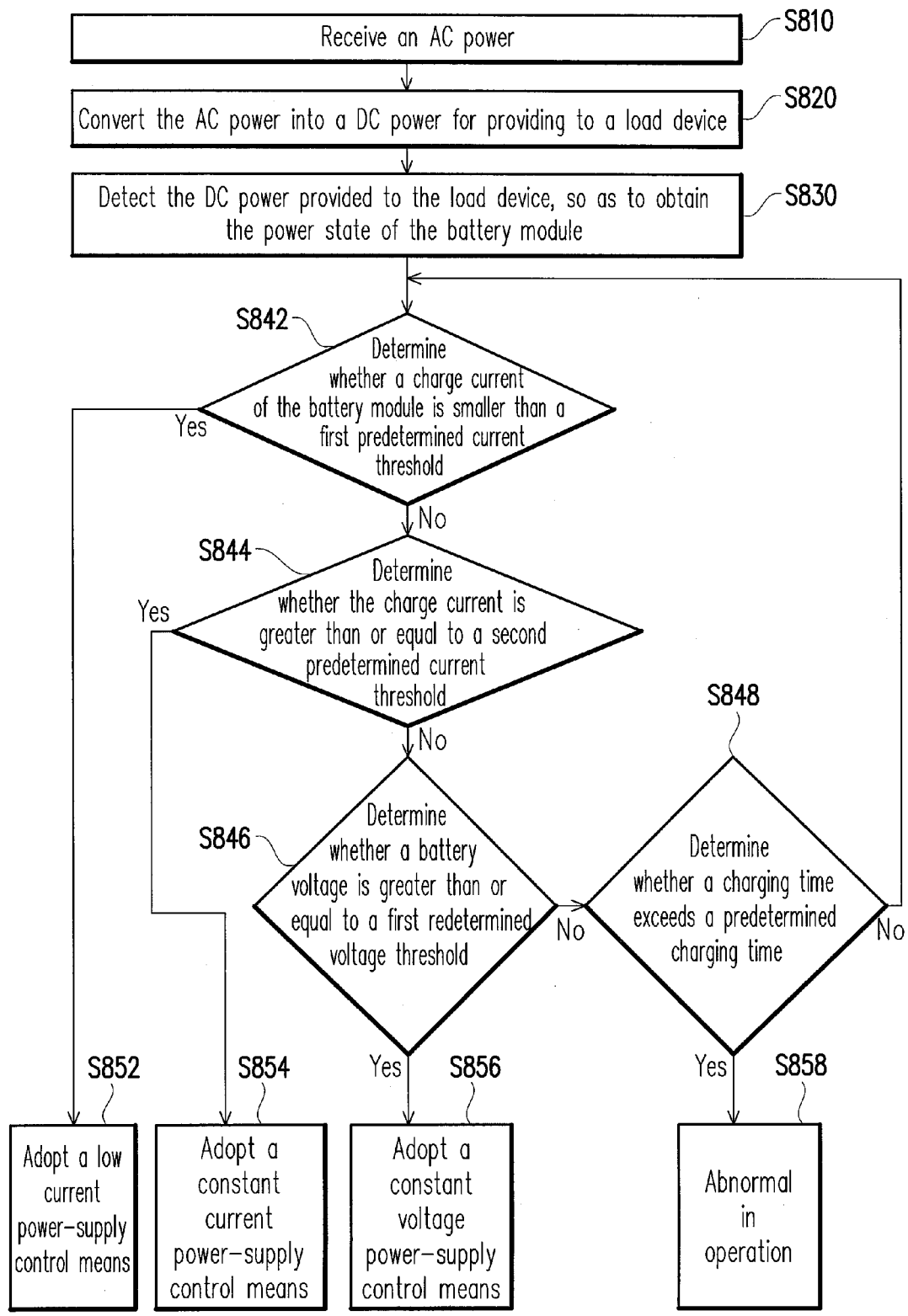
FIG. 8 is a flowchart illustrating a method for controlling power supply of a smart power adaptor according to the embodiment of FIG. 7.

An implementation of the embodiment of FIG. 7 is further described below with reference of the steps of FIG. 8, where FIG. 8 is a flowchart illustrating a method for controlling power supply of a smart power adaptor according to the embodiment of FIG. 7.

Referring to FIG. 1 and FIG. 8, in the present embodiment, the power conversion circuit 110 also receives the AC power AC_in (step S810), and converts the AC power AC_in into the DC power DC_out for providing to the load device 10 (step S820). Then, during the period that the power conversion circuit 110 performs the AC-DC conversion, the control unit 120 detects the DC power DC_out provided to the load device 10, so as to obtain the power state of the battery module BM (step S830).

Thereafter, the control unit 120 first determines whether the charge current of the battery module BM is smaller than a first predetermined current threshold according to the obtained power state (step S842). Taking a lithium battery as an example, the first predetermined current threshold is, for example, between 10-100 mA, though the invention is not limited thereto.

In the step S842, if the control unit 120 determines that the charge current of the battery module BM is smaller than the first predetermined current threshold, it represents that the battery module BM is now probably operated under a precharge mode. Therefore, the control unit 120 correspondingly adopts the low current power-supply control means to control the operation of the power conversion circuit 110, and the power conversion circuit 110 provides the DC power DC_out with a value lower than the first predetermined current threshold (for example, 100 mA) to charge the battery module BM (step S852). Conversely, if the control unit 120 determines that the charge current of the battery module BM is greater than or equal to the first predetermined current threshold, the control unit 120 further determines whether the charge current of the battery module BM is greater than or equal to a second predetermined current threshold (step S844). Taking the lithium battery as an example, the second predetermined current threshold is, for example, 1 A, thought the invention is not limited thereto.

In the step S844, if the control unit 120 determines that the charge current of the battery module BM is greater than or equal to the second predetermined current threshold, it represents that the battery module BM is now probably operated under a constant current charge mode (or referred to as a fast charge mode). Therefore, the control unit 120 correspondingly adopts the constant current power-supply control means to control the operation of the power conversion circuit 110, and the power conversion circuit 110 provides the DC power DC_out in a constant current mode (for example, a constant current of 1 A) to charge the battery module BM (step S854). Conversely, if the control unit 120 determines that the charge current of the battery module BM is smaller than the second predetermined current threshold, the control unit 120 further determines whether a battery voltage of the battery module BM is greater than or equal to a first predetermined voltage threshold (step S846). Taking the lithium battery as an example, the first predetermined voltage threshold is, for example, 4.2V, thought the invention is not limited thereto.

In step S846, if the control unit 120 determines that the battery voltage of the battery module BM is greater than the first predetermined voltage threshold, it represents that the battery module BM is now probably operated under a constant voltage charge mode. Therefore, the control unit 120 correspondingly adopts the constant voltage power-supply control means to control the operation of the power conversion circuit 110, and the power conversion circuit 110 provides the DC power DC_out in a constant voltage mode (for example, a constant voltage of 5V) to charge the battery module BM (step S856).

If the control unit 120 determines that the battery voltage of the battery module BM is smaller than the first predetermined voltage threshold, the control unit 120 continuously determines whether a charging time exceeds a predetermined charging time (step S848). If the control unit 120 determines that the charging time of the battery module BM exceeds the predetermined charging time, the control unit 120 determines that the smart power adaptor 100 or the battery module BM is abnormal in operation, and stops/limits the operation of the power conversion circuit 110 (step S858). If the control unit 120 determines that the charging time of the battery module BM does not exceed the predetermined charging time, the method flow returns back to the step S842 to repeat the steps S842, S844, S846 and S848 to determine whether the power state is matched with the predetermined power conditions.

Besides, in another exemplary embodiment, after the step S846, a step of determining whether a current amount ratio of the battery module BM is greater than or equal to a first predetermined ratio (for example, smaller than 50 mA) can be added. In the present exemplary embodiment, if the control unit 120 determines that the battery voltage is greater than or equal to the first predetermined voltage threshold, and the current amount ratio is smaller than the first predetermined ratio, the control unit 120 adopts the constant voltage power-supply control means to control the power conversion circuit 110 (step S856). If the control unit 120 determines that the battery voltage is greater than or equal to the first predetermined voltage threshold, and the current amount ratio is greater than or equal to the first predetermined ratio, the control unit 120 adopts the low current power-supply control means similar to that of the step S852 to control the power conversion circuit 110, and the power conversion circuit 110 provides the DC power DC_out with a value lower than a predetermined current value (which can be different to the predetermined current value of the step S852) to charge the battery module BM. Moreover, if the control unit 120 determines that the battery voltage is smaller than the first predetermined voltage threshold, the control unit 120 executes the step S848 to determine whether the charging time exceeds the predetermined charging time.

It should be noticed that the charging control method/charging communication protocol of the present embodiment can be used in collaboration with the charging control method of the embodiment of FIG. 5 or the embodiment of FIG. 7. To be specific, after the behaviour sequence, the predetermined power parameter and the charging behaviour criterion of the power-supply control means are defined according to the charging control method/charging communication protocol of the present embodiment, switching of each of the power-supply control means can be determined according to the method that the control unit 120 passively receives the power mode command as that described in the embodiment of FIG. 5, or according to the method that the control unit 120 actively detects the power state as that described in the embodiment of FIG. 7, which is not limited by the invention.

Moreover, in an exemplary embodiment of the invention, the control unit 120 can also correspondingly adjust the predetermined power parameter and the charging behaviour criterion of each of the power-supply control means according to a battery service life characteristic of the battery module BM, such that the power conversion circuit 110 can dynamically adjust the power specification of the DC power DC_out along with aging of the battery module BM.

For example, the control unit 120 can obtain the battery service life characteristic (for example, a corresponding relationship between a number of charge cycles and a fully charged voltage) and the number of charge cycles of the battery module BM from the battery specification information. The control unit 120 can determine whether a current number of charge cycles of the battery module BM reaches a predetermined number. If it is determined that the current number of charge cycles reaches the predetermined number, it represents that the battery module BM theoretically has a certain degree of aging phenomenon. Therefore, the control unit 120 correspondingly adjusts/decreases the predetermined power parameter/charging behaviour criterion of each of the power-supply control means, so as to avoid frequent occurrence of an over charge phenomenon caused by aging of the battery. The predetermined number can be set by the control unit 120 according to the battery service life characteristic.

In summary, the invention provides a smart power adaptor an a method for controlling power supply thereof, by which a corresponding power-supply control means is adaptively adopted to control generation of the DC power according to a current power state/charge mode of the battery module, such that the power of the DC power provided by the smart power adaptor can be dynamically varied according to an actual power requirement of the load device. In this way, the smart power adaptor of the invention can effectively avoid a power waste to achieve higher power supplying efficiency.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A smart power adaptor, comprising:
   a power conversion circuit, configured to convert an alternating current (AC) power into a direct current (DC) power for providing to a load device; and
   a control unit, coupled to the power conversion circuit, and configured to adopt a corresponding power-supply control means to control an operation of the power conversion circuit according to a power state of a battery module of the load device,
   wherein, such that the power conversion circuit uses at least one of a plurality of different power conversion operations to generate the DC power in response to changing of the power state, and the power conversion operations are operated respectively based on different electronic characteristics.

2. The smart power adaptor as claimed in claim 1, wherein the control unit further obtains battery specification information from a charge control chip of the battery module through a transmission interface, and takes the battery specification information as a basis for adjusting a plurality of the power-supply control means.

3. The smart power adaptor as claimed in claim 2, wherein the battery specification information includes a battery service life characteristic and a number of charge cycles, and when the control unit determines that the number of charge cycles of the battery module reaches a predetermined number, the control unit adjusts at least one of a predetermined power parameter and a charging behaviour criterion of each of the power-supply control means, wherein the predetermined number is determined by the control unit according to the battery service life characteristic.

4. The smart power adaptor as claimed in claim 1, wherein the control unit further sets a predetermined power parameter and a charging behaviour criterion of a plurality of different power-supply control means, and controls the operation of the power conversion circuit according to the predetermined power parameter and the charging behaviour criterion.

5. The smart power adaptor as claimed in claim 4, wherein the predetermined power parameter comprises at least one of a predetermined voltage parameter, a predetermined current parameter and a predetermined charging time parameter.

6. The smart power adaptor as claimed in claim 4, wherein the charging behaviour criterion comprises at least one of an upper limit voltage condition, an upper limit current condition and an upper limit temperature condition.

7. The smart power adaptor as claimed in claim 1, wherein the control unit communicates with a charge control chip of the battery module through a transmission interface to obtain a power mode command, wherein the power mode command indicates the power state of the battery module.

8. The smart power adaptor as claimed in claim 7, wherein when the control unit receives a pre-charge mode command sent by the charge control chip, the control unit uses a low current power-supply control means to control the power conversion circuit, and the power conversion circuit provides the DC power with a current value lower than a first predetermined current value to charge the battery module.

9. The smart power adaptor as claimed in claim 7, wherein when the control unit receives a constant current charge mode command sent by the charge control chip, the control unit uses a constant current power-supply control means to control the power conversion circuit, and the power conversion circuit provides the DC power with a constant current to charge the battery module.

10. The smart power adaptor as claimed in claim 7, wherein when the control unit receives a constant voltage charge mode command sent by the charge control chip, the control unit uses a constant voltage power-supply control means to control the power conversion circuit, and the power conversion circuit provides the DC power with a constant voltage to charge the battery module.

11. The smart power adaptor as claimed in claim 7, wherein when the control unit receives a replenish charge mode command sent by the charge control chip, the control unit uses a low current power-supply control means to control the power conversion circuit, and the power conversion circuit provides the DC power with a current value lower than a second predetermined current value to charge the battery module.

12. The smart power adaptor as claimed in claim 1, wherein the control unit obtains the power state of the battery module by detecting the DC power provided to the load device.

13. The smart power adaptor as claimed in claim 12, wherein when the control unit determines that the power state is matched with a first power condition, the control unit uses a low current power-supply control means to control the power conversion circuit, and the power conversion circuit provides the DC power with a current value lower than a predetermined current value to charge the battery module.

14. The smart power adaptor as claimed in claim 13, wherein when a charge current of the battery module is smaller than a first predetermined current threshold, the control unit determines that the power state is matched with the first power condition.

15. The smart power adaptor as claimed in claim 13, wherein when a current amount ratio of the battery module is greater than or equal to a first predetermined ratio, the control unit determines that the power state is matched with the first power condition.

16. The smart power adaptor as claimed in claim 12, wherein when the control unit determines that the power state is matched with a second power condition, the control unit uses a constant current power-supply control means to control the power conversion circuit, and the power conversion circuit provides the DC power with a constant current to charge the battery module.

17. The smart power adaptor as claimed in claim 16, wherein when a charge current of the battery module is greater than or equal to a second predetermined current threshold, the control unit determines that the power state is matched with the second power condition.

18. The smart power adaptor as claimed in claim 11, wherein when the control unit determines that the power state is matched with a third power condition, the control unit uses a constant voltage power-supply control means to control the power conversion circuit, and the power conversion circuit provides the DC power with a constant voltage to charge the battery module.

19. The smart power adaptor as claimed in claim 18, wherein when a battery voltage of the battery module is greater than or equal to a first predetermined voltage threshold, the control unit determines that the power state is matched with the third power condition.

20. The smart power adaptor as claimed in claim 1, wherein the power conversion circuit comprises:
    an input stage circuit, configured to receive the AC power and rectify and filter the AC power to generate a rectified voltage;
    a power stage circuit, coupled to the input stage circuit, and configured to convert the rectified voltage into a DC voltage; and
    a switching mode power regulation circuit, coupled to the power stage circuit and the control unit, and controlled by the control unit to regulate the DC voltage, so as to generate the DC power.

21. The smart power adaptor as claimed in claim 20, wherein the switching mode power regulation circuit is one of a constant current and constant voltage switch circuit, a pulse width modulation switch circuit and a synchronous rectifying circuit.

22. The smart power adaptor as claimed in claim 20, wherein the DC power comprises a DC output voltage and a DC output current, and the control unit comprises:
    a microcontroller (MCU), configured to adopt the corresponding power-supply control means to control a switch operation of the switching mode power regulation circuit according to the power state, so as to adjust at least one of the DC output voltage and the DC output current.

23. The smart power adaptor as claimed in claim 22, wherein the control unit further comprises:
    a protection circuit, coupled to the microcontroller, configured to detect an operation state of the smart power adaptor, and sending a state detection signal to the microcontroller.

24. The smart power adaptor as claimed in claim 23, wherein the protection circuit comprises at least one of an over current protection circuit, an over voltage protection circuit and an over temperature protection circuit.

25. The smart power adaptor as claimed in claim 22, wherein the control unit further comprises:
    a power detecting circuit, coupled to the microcontroller, configured to detect the DC power provided to the load device, and accordingly outputting an output power signal to the microcontroller.

26. The smart power adaptor as claimed in claim 22, wherein the control unit further comprises:
    a wakeup circuit, coupled to the microcontroller, configured to detect whether the smart power adaptor is connected to the load device, and sending a wakeup signal to the microcontroller when determining that the smart power adaptor is connected to the load device.

27. The smart power adaptor as claimed in claim 22, wherein the control unit further comprises:
    a prompt module, coupled to the microcontroller, and configured to generate a power-supply state prompt according to a state indication signal sent by the microcontroller.

28. A method for controlling power supply of a smart power adaptor, comprising:
- receiving an alternating current (AC) power;
- converting the AC power into a direct current (DC) power for providing to a load device; and
- adopting a corresponding power-supply control means to control generation of the DC power according to a power state of a battery module of the load device, and using at least one of different power conversion operations to generate the DC power in response to changing of the power state, wherein the power conversion operations are operated respectively based on different electronic characteristics.

29. The method for controlling power supply of the smart power adaptor as claimed in claim 28, wherein the step of adopting the corresponding power-supply control means to control generation of the DC power according to the power state of the battery module of the load device comprises:
- obtaining battery specification information from a charge control chip of the battery module through a transmission interface;
- selecting a plurality of different power-supply control means according to the battery specification information;
- setting a predetermined power parameter and a charging behaviour criterion of each power-supply control means; and
- generating the DC power according to the predetermined power parameter and the charging behaviour criterion.

30. The method for controlling power supply of the smart power adaptor as claimed in claim 29, wherein the battery specification information comprises a battery service life characteristic and a number of charge cycles, and the step of adopting the corresponding power-supply control means to control generation of the DC power according to the power state of the battery module of the load device comprises:
- determines whether the number of charge cycles reaches a predetermined number; and
- adjusting at least one of the predetermined power parameter and the charging behaviour criterion when the number of charge cycles reaches the predetermined number, wherein the predetermined number is determined according to the battery service life characteristic.

31. The method for controlling power supply of the smart power adaptor as claimed in claim 28, wherein the step of adopting the corresponding power-supply control means to control generation of the DC power according to the power state of the battery module of the load device comprises:
- receiving a power mode command from a charge control chip of the battery module through a transmission interface, wherein the power mode command indicates the power state of the battery module; and
- adopting the power-supply control means corresponding to the power mode command to control generation of the DC power.

32. The method for controlling power supply of the smart power adaptor as claimed in claim 28, wherein the step adopting the corresponding power-supply control means to control generation of the DC power according to the power state of the battery module of the load device comprises:
- detecting the DC power provided to the load device, so as to obtain the power state of the battery module;
- comparing the power state with a plurality of power conditions; and
- adopting the power-supply control means corresponding to the power condition matched with the power state to control generation of the DC power.

* * * * *